United States Patent
Li et al.

(10) Patent No.: US 9,160,161 B2
(45) Date of Patent: Oct. 13, 2015

(54) SYSTEM AND METHOD FOR GROUND FAULT DETECTION AND PROTECTION IN ADJUSTABLE SPEED DRIVES

(75) Inventors: Huaqiang Li, Menomonee Falls, WI (US); Yakov Lvovich Familiant, Brown Deer, WI (US)

(73) Assignee: Eaton Corporation, Cleveland, OH (US)

(*) Notice: Subject to any disclaimer, the term of this patent is extended or adjusted under 35 U.S.C. 154(b) by 653 days.

(21) Appl. No.: 13/464,014

(22) Filed: May 4, 2012

(65) Prior Publication Data
US 2013/0293988 A1 Nov. 7, 2013

(51) Int. Cl.
*H02H 7/08* (2006.01)
*H02H 3/16* (2006.01)
*H02P 29/02* (2006.01)
*H02H 7/122* (2006.01)

(52) U.S. Cl.
CPC ............ *H02H 3/165* (2013.01); *H02H 7/1227* (2013.01); *H02P 29/021* (2013.01); *H02P 29/027* (2013.01)

(58) Field of Classification Search
USPC .................................. 361/42, 753, 54, 61, 30
See application file for complete search history.

(56) References Cited

U.S. PATENT DOCUMENTS

| | | | |
|---|---|---|---|
| 5,214,575 A | 5/1993 | Sugishima et al. | |
| 5,508,620 A | 4/1996 | Pfiffner | |
| 5,687,049 A | 11/1997 | Mangtani | |
| 5,896,257 A * | 4/1999 | Takahashi ....................... 361/31 |
| 5,945,802 A | 8/1999 | Konrad et al. | |
| 6,335,608 B1 | 1/2002 | Takahashi | |
| 6,546,342 B1 * | 4/2003 | Dougherty et al. ............. 702/58 |
| 6,757,626 B2 * | 6/2004 | Dougherty et al. ............. 702/58 |
| 6,856,137 B2 | 2/2005 | Roden et al. | |
| 7,227,325 B1 | 6/2007 | Talja et al. | |

(Continued)

FOREIGN PATENT DOCUMENTS

| | | |
|---|---|---|
| EP | 2178185 A2 | 4/2010 |
| EP | 2439827 A2 | 4/2012 |

(Continued)

OTHER PUBLICATIONS

George et al., "PGR-5701 Ground Fault Monitor With Variable Frequency Drive," Littlefuse Startco Test Report, Canada, pp. 1-26.

(Continued)

*Primary Examiner* — Eduardo Colon Santana
*Assistant Examiner* — Iftekhar Mustafa
(74) *Attorney, Agent, or Firm* — Ziolkowski Patent Solutions Group, SC (57) ABSTRACT

A system and method for detecting ground faults in an AC motor drive is disclosed. A fault detection and protection system for an AC motor drive includes current sensors to measure first and second phase output currents, a voltage sensor to measure a DC link voltage, and a desaturation control circuit to determine a voltage and associated current across PWM inverter switches for a third phase of the output. A controller compares the first and second phase currents, the measured DC link voltage, and the voltage across the PWM inverter switches on the third phase, to a plurality of thresholds. The controller detects a ground fault on one of the first, second, and third phases of the three phase output to the AC motor based on the comparisons of the first and the second phase currents, the DC link voltage, and the voltage across the switches to the thresholds.

24 Claims, 9 Drawing Sheets

(56) References Cited

U.S. PATENT DOCUMENTS

| | | | |
|---|---|---|---|
| 7,279,861 B2 | 10/2007 | Takahashi et al. | |
| 7,403,364 B2 * | 7/2008 | Anderson et al. | 361/79 |
| 7,443,643 B2 | 10/2008 | Kubo | |
| 7,830,935 B2 | 11/2010 | Ando et al. | |
| 8,004,803 B2 | 8/2011 | Schnetzka | |
| 8,013,612 B2 | 9/2011 | Morini et al. | |
| 8,698,504 B2 * | 4/2014 | Wei et al. | 324/509 |
| 2008/0151445 A1 | 6/2008 | Leppanen | |
| 2009/0080127 A1 | 3/2009 | Mirafzal | |
| 2009/0109713 A1 | 4/2009 | Schnetzka et al. | |
| 2010/0213884 A1 | 8/2010 | Xiang | |
| 2010/0244760 A1 | 9/2010 | Anwar et al. | |
| 2011/0141774 A1 * | 6/2011 | Kane et al. | 363/37 |
| 2011/0241590 A1 | 10/2011 | Horikoshi et al. | |

FOREIGN PATENT DOCUMENTS

| | | | |
|---|---|---|---|
| JP | 5328739 A | 12/1993 | |
| JP | 7239359 A | 9/1995 | |
| JP | 2008109748 A | 8/2008 | |
| JP | 2009254179 A | 10/2009 | |
| JP | 2011080823 A | 4/2011 | |
| WO | 2006069568 A1 | 7/2006 | |

OTHER PUBLICATIONS

Rodriguez-Valdez et al., "Method for line-ground fault detection in Variable Frequency Drives," IEEE, 2011, pp. 1-7.

Trabelsi et al., "Multiple IGBTs Open Circuit Faults Diagnosis in Voltage Source Inverter Fed Induction Motor Using Modified Slope Method," XIX International Conference on Electrical Machines—ICEM 2010, Rome, pp. 1-6.

Harke et al., "The Spatial Effect and Compensation of Current Sensor Differential Gains for Three-Phase Three-Wire Systems," IEEE Transactions on Industry Applications, vol. 44, No. 4, Jul./Aug. 2008, pp. 1181-1189.

Bojoi et al., "Vector Control of Dual-Three-Phase Induction-Motor Drives Using Two Current Sensors," IEEE Transactions on Industry Applications, vol. 42, No. 5, Sep./Oct. 2006, pp. 1284-1292.

PCT International Search Report and Written Opinion from corresponding PCT/US2013/037795, Dec. 3, 2013.

* cited by examiner

SYSTEM AND METHOD FOR GROUND FAULT DETECTION AND PROTECTION IN ADJUSTABLE SPEED DRIVES

BACKGROUND OF THE INVENTION

The present invention relates generally to adjustable speed drives (ASDs) and, more particularly, to a system and method for detecting ground faults in an ASD and protecting the ASD from such ground faults upon detection thereof.

Adjustable speed drives (ASDs) are widely used in motor control field for energy efficiency improvement. Such ASDs are typically connected to a three-phase AC power supply, with the ASD including an AC/DC converter for converting three-phase AC power supplied from the three-phase AC power supply into DC power and also including a DC/AC converter for converting the DC power output from the AC/DC converter into three-phase AC power for supply to a motor.

In providing power to a motor via an ASD, it is necessary to be able to detect current faults that might occur and provide protection to the ASD when such faults are detected. A common cause of such current faults is motor winding insulation failures that occur during operation. Such winding insulation failures may cause a winding shorted to the motor grounded enclosure, resulting in a ground fault. When this happens, the shorted phase current on the ASD output phase will rise sharply and, if there is no fault detection and protection in place, the ASD equipment can be damaged. Thus, it can be seen that the detection of current faults and the implementation of a protection scheme for the ASD upon such fault detection, is an important consideration in motor drive applications.

A common solution for detecting current faults is to measure all three-phase currents on the motor side through the use of current sensors. To this end, over-current protection circuitry typically includes a means for monitoring all three-phase motor currents (i.e., three current sensors) and means for shutting off the inverter IGBTs (insulated gate bipolar trasistors) when a current irregularity is identified. When one of the line currents exceeds a predetermined threshold value, the circuitry recognizes the possibility of a short and shuts off the inverter to all three motor phases, effectively stopping the motor until the cause of the irregularity is identified. This solution is very effective in ground fault detection and protection; however, the costs of all three current sensors, as well as the supporting circuitry can be expensive.

As the detection of current faults via measuring all three-phase currents through the use of three current sensors can be expensive, current fault detection has also previously been achieved with the use of only two current sensors. In such systems, the remaining one of the three phase currents is obtained through calculation by assuming that the sum of the three phase currents is zero. Unfortunately, where only two line currents are measured and the third current is derived, the derived current may not reflect a fault to ground in the third line. This is because a connection to ground in the third line may not significantly affect the currents in the first and second lines. If a short occurs in a third line and is not detected because the third line current is derived via the first and second sensed currents, the over-current circuitry cannot operate properly to shut off current to the three phases and motor damage may occur.

It would therefore be desirable to provide a current sensing and protection apparatus and method wherein all currents in a three phase motor system can be derived using less than three current sensors and complete over-current protection can also be provided via the sensed currents and specific voltages, such as the DC link voltage and inverter IGBT saturation voltages.

BRIEF DESCRIPTION OF THE INVENTION

Embodiments of the present invention provide a system and method for detecting ground faults in an ASD and protecting the ASD from such ground faults upon detection thereof In accordance with one aspect of the invention, an AC motor drive having an input connectable to an AC source and a three phase output connectable to an input terminal of an AC motor is provided, with the AC motor drive including a pulse width modulation (PWM) inverter having a plurality of switches therein to control current flow and terminal voltages in the AC motor. The AC motor drive also includes a fault detection and protection system connected to the PWM converter, with the fault detection and protection system further including a pair of current sensors to measure a current on a first phase and a second phase of the AC motor drive output, a voltage sensor to measure a DC link voltage on a DC link of the AC motor drive, a desaturation control circuit configured to determine a voltage and associated current across switches of the PWM inverter corresponding to a third phase of the three phase output, and a controller configured to compare the current measured on the first phase and the second phase of the three phase output to a first threshold, compare the measured DC link voltage to a second threshold, compare the voltage across the switches of the PWM inverter on the third phase to a third threshold, and detect a ground fault on one of the first, second, and third phases of the three phase output to the AC motor based on the comparisons of the first and the second phase currents, DC link voltage, and voltage across the switches on the third phase, to the first, second, and third thresholds.

In accordance with another aspect of the invention, a method for detecting a ground fault in an AC motor drive includes providing an AC motor drive in series between an AC power source and the AC motor, the AC motor drive comprising a pulse width modulation (PWM) inverter having a plurality of switches and being configured to condition a three phase output to the AC motor. The method also includes measuring current at least on each of a first phase and a second phase of the three phase output by way of current sensors included on the first phase and the second phase, measuring a voltage on a DC link of the AC motor drive, and measuring a voltage across switches of the PWM inverter corresponding to a third phase of the three phase output by way of a desaturation control circuit, with a current across the switches of the PWM inverter corresponding to the third phase also being determined based on the measured voltage. The method further includes comparing the current measured on the first phase and the second phase of the three phase output to a first threshold, comparing the measured DC link voltage to a second threshold, comparing the voltage across the switches of the PWM inverter on the third phase to a third threshold, and determining the presence of a ground fault on one of the first, second, and third phases of the three phase output to the AC motor based on the comparisons of the first and the second phase currents, DC link voltage, and voltage across the switches on the third phase, to the first, second, and third thresholds.

In accordance with yet another aspect of the invention, a system for detecting a ground fault in an AC motor drive includes a pair of current sensors to measure a current on a first phase and a second phase of a three phase output of the AC motor drive, a voltage sensor to measure a DC link voltage on a DC link in the AC motor drive, and a desaturation control circuit configured to determine a voltage and associated current across insulated gate bipolar transistors (IGBTs) of an inverter in the AC motor drive, the desaturation control circuit determining the voltage and associated current at least on a third phase of the three phase output. The system also includes a controller configured to compare the current measured on the first phase and the second phase of the three phase output to a first threshold, compare the measured DC link voltage to a second threshold, compare the voltage across the IGBTs of the inverter corresponding to the third phase to a third threshold, and declare a ground fault on one of the first, second, and third phases of the three phase output if one of the first and the second phase currents is above the first threshold and the DC link voltage is above the second threshold or if the first and the second phase currents are below the first threshold, the DC link voltage is above the second threshold, and the voltage across IGBTs of the inverter corresponding to the third phase is above the third threshold.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION OF THE PREFERRED EMBODIMENT

The embodiments of the invention set forth herein relate to a system and method for detecting ground faults in an adjustable speed drive (ASD) and for protecting the ASD from such ground faults upon detection thereof.

Figure 1:
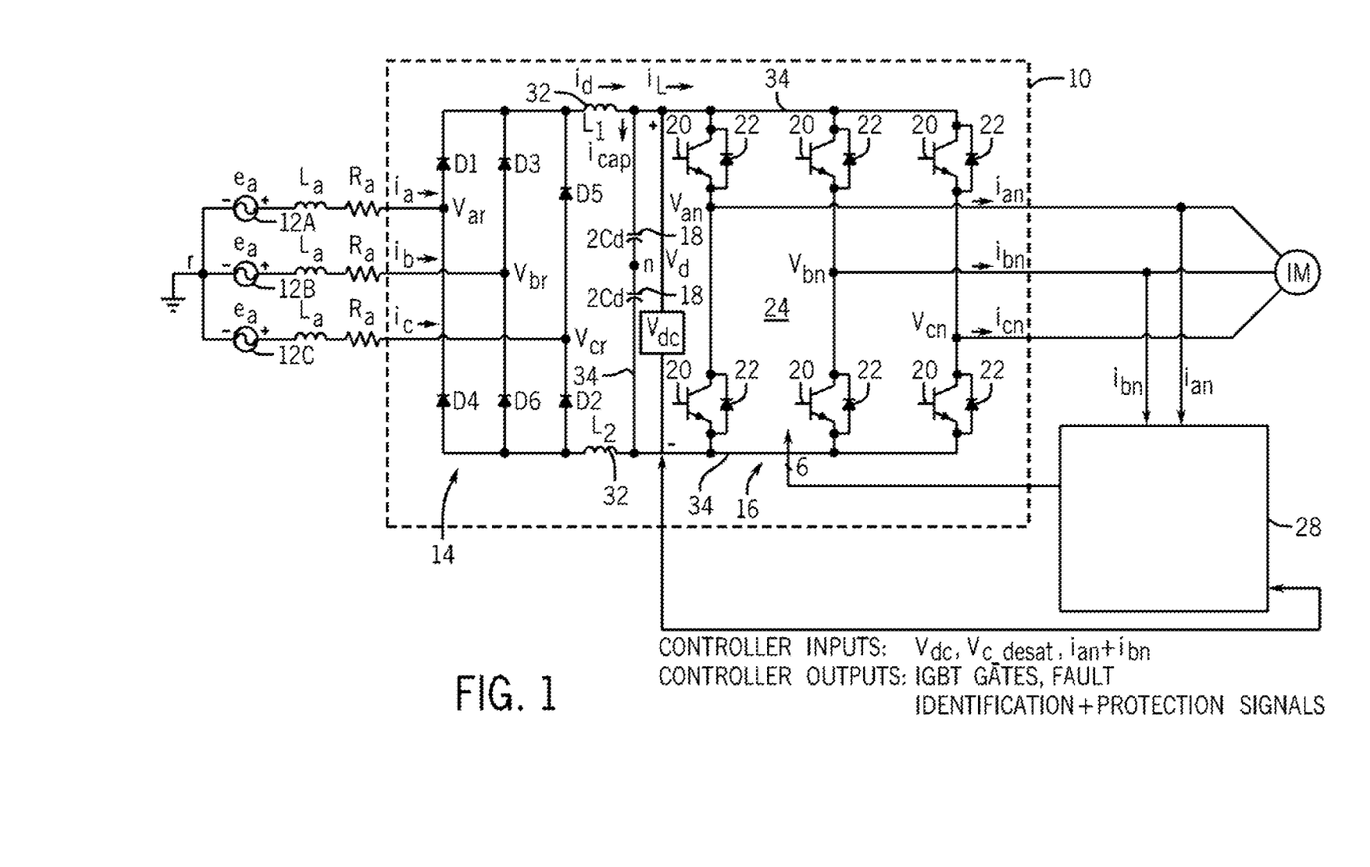
FIG. 1 a schematic of an adjustable speed motor drive (ASD), according to an embodiment of the invention.

Embodiments of the invention are directed to AC motor drives encompassing a plurality of structures and control schemes. A structure of an AC motor drive 10 that may be implanted with embodiments of the invention is shown in FIG. 1. The motor drive 10 may be configured, for example, as an adjustable speed drive (ASD) designed to receive a three AC power input, rectify the AC input, and perform a DC/AC conversion of the rectified segment into a three-phase alternating voltage of variable frequency and amplitude that is supplied to a load. In a preferred embodiment, the ASD 10 operates according to an exemplary volts-per-hertz characteristic. In this regard, the motor drive provides voltage regulation of ±1% in steady state with less than 3% total harmonic distortion, ±0.1 Hz in output frequency, and fast dynamic step load response over a full load range.

In an exemplary embodiment, a three-phase AC input 12a-12c is fed to a three-phase rectifier bridge 14. The input line impedances are equal in all three phases. The rectifier bridge 14 converts the AC power input to a DC power such that a DC link voltage is present between the rectifier bridge 14 and a switch array 16. The link voltage is smoothed by a DC link capacitor bank 18. The switch array 16 is comprised of a series of insulated gate bipolar transistor switches 20 (IGBTs) and anti-parallel diodes 22 that collectively form a PWM inverter 24. The PWM inverter 24 synthesizes AC voltage waveforms with a fixed frequency and amplitude for delivery to a load, such as an induction motor 26.

Operation of the inverter 24 is via a control system 28, which may further be comprised of a plurality of PID controllers each having a system layer and a programmable application layer that perform high speed operations such as space-vector modulation, DC link voltage decoupling, and protection, for example. The control system 28 interfaces to the PWM inverter 24 via gate drive signals and sensing of the DC link voltage and pole currents (by way a voltage sensor 30 for example) such that changes in DC link voltage can be sensed. These voltage changes can be interpreted as transient load conditions and are used to control switching of the switch array 16 of PWM inverter 24 such that near steady-state load conditions are maintained. Additionally, control system 28 functions to identify ground current related faults in ASD 10 and protect the ASD from such faults, including protecting IGBT switches 20. In performing such a fault detection and protection, control system receives DC link voltage, measured IGBT saturation voltages, and two phase output current as inputs, while outputting IGBT gate drive signals, and fault identification and protection signals responsive to the inputs, as will be explained in greater detail below.

As further shown in FIG. 1, AC motor drive 10 also includes DC link chokes L1, L2 (indicated in FIG. 1 as 32) positioned on the positive and negative rails of the DC link 34. The DC link chokes 32 provide energy storage and filtering on the DC link during operation of AC motor drive 10 and motor 26.

Figure 2:
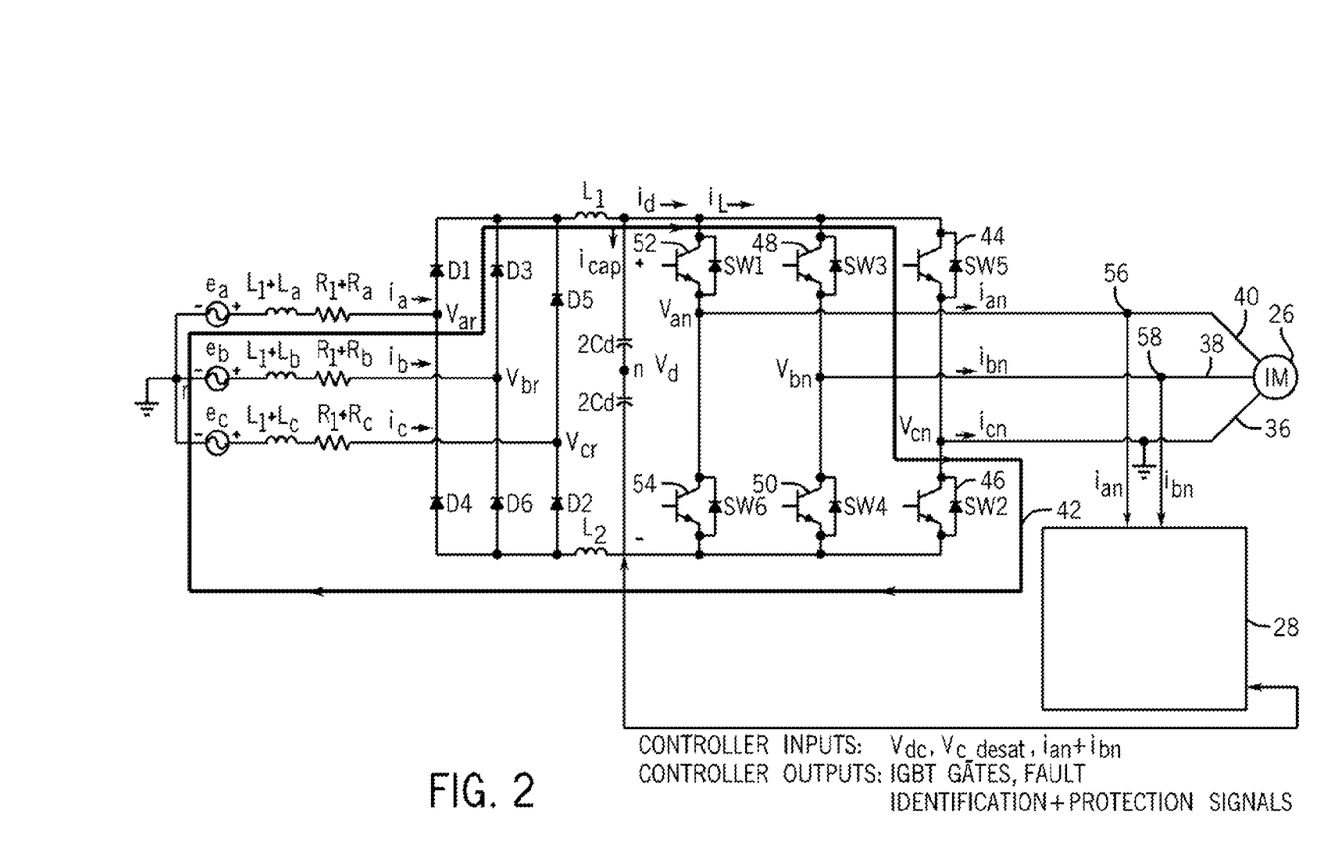
FIGS. 2 and 3 are schematics of the ASD of claim 1 illustrating an example of varying fault current flow paths in the ASD.
Figure 3:
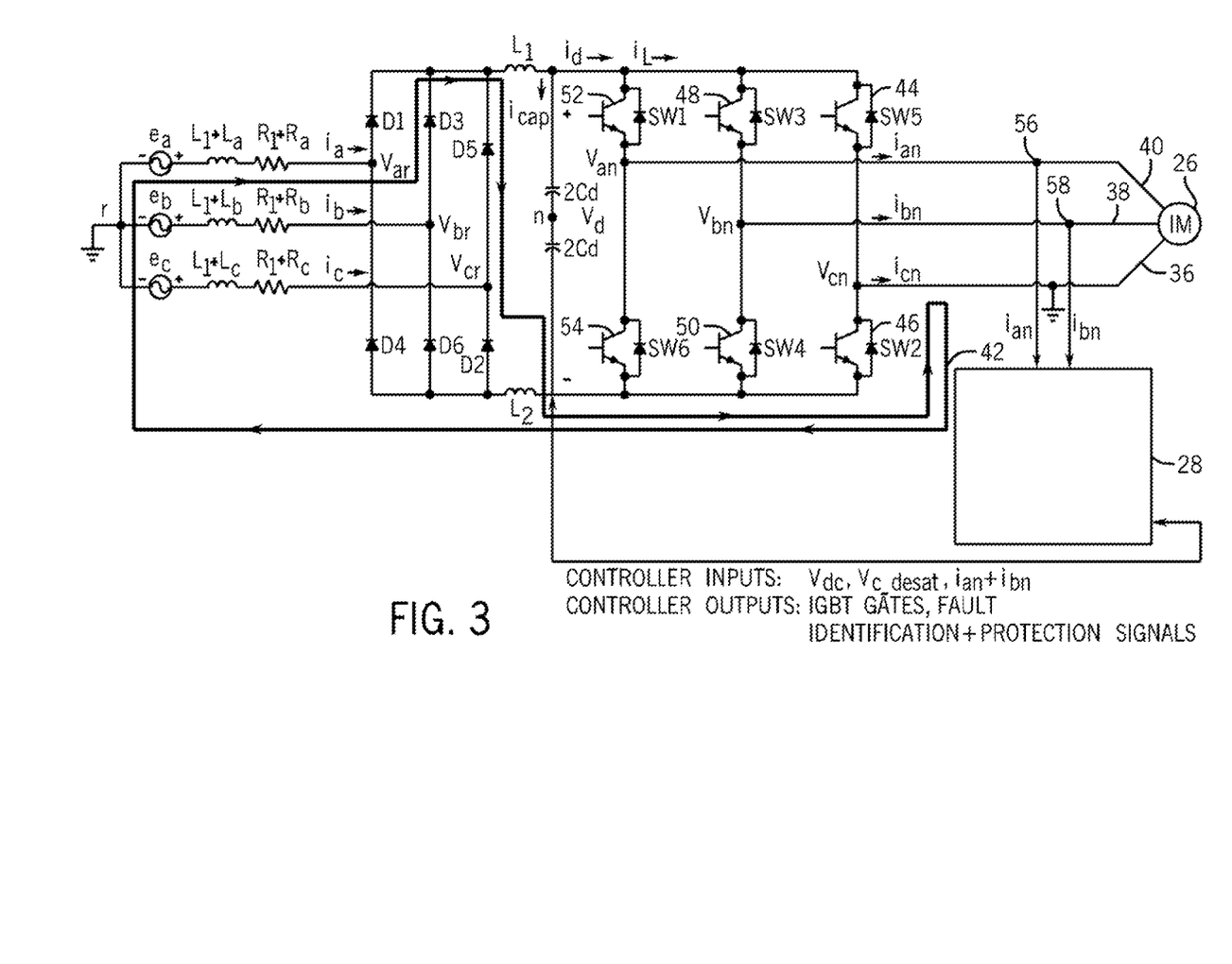

Referring now to FIGS. 2 and 3, the AC motor drive 10 is shown during operation when an earth ground fault is introduced in phase-C (indicated in FIGS. 2 and 3 as 36, with phase-B and phase-A indicated as 38, 40, respectively) on the motor load side. Referring first to FIG. 2, a fault current flow path 42 is shown when an upper switch transistor 44 on phase-C is gated on. With upper switch transistor 44 gated on, the faulted phase-C becomes a boost circuit. The fault current thus provides energy storage through the DC choke L1 on the positive DC link. As shown in FIG. 3, when the upper switch transistor 44 on phase-C is gated off and the lower switch transistor 46 on phase-C is gated on, the current flow path 42 changes. That is, the current flow path 42 continues to flow in the same direction, but now changes path so as to charge the DC link capacitors of DC link capacitor bank 18. This cycle, of fault current flow path 42 alternating to provide energy storage through the DC choke L1 and to charge the DC link capacitors of DC link capacitor bank 18, is repeated as the upper and lower transistors 44, 46 are switched on and off in the pulse width modulation pattern of inverter 24.

The characteristics regarding a fault current flow path are similar if the faulted phase happens to be any of the other phases, i.e., phase-B or phase-A, where the switches corresponding thereto are gated on and off. For clarity, the pairs of switches that influence the DC link voltage are switches 44, 46 for a phase-C ground fault, switches 48, 50 for a phase-B ground fault, and switches 52, 54 for a phase-A ground fault.

As shown in FIGS. 2 and 3, control system 28 receives DC link voltage, measured IGBT saturation voltages, and two phase output current as inputs, while outputting IGBT gate drive signals, and fault identification and protection signals responsive to the inputs, as will be explained in greater detail below. Control system 28 is configured to identify ground current related faults in ASD 10 and protect the ASD from such faults, including protecting IGBT switches 20. With respect to the identification of a ground fault on phase A, B, or C, it is recognized that there typically are three current sensors on the output motor load side to enable such ground fault detection. However, according to embodiments of the invention, a technique is provided for ground fault detection in ASD systems that utilizes only two current sensors, such as current sensors 56, 58 on phase-A and phase-B 40, 38, respectively, in FIGS. 2 and 3. In employing a technique for ground fault detection in ASD systems that utilizes only two current sensors, a desaturation control circuit already installed on each phase power structure in the ASD that detects an overcurrent condition (such as in the case of a short circuit, for example) is employed and the measured DC link voltage is also utilized, with the DC link voltage being measured by a voltage sensor, such as voltage sensor 30 shown in FIG. 1, for example.

Figure 4:
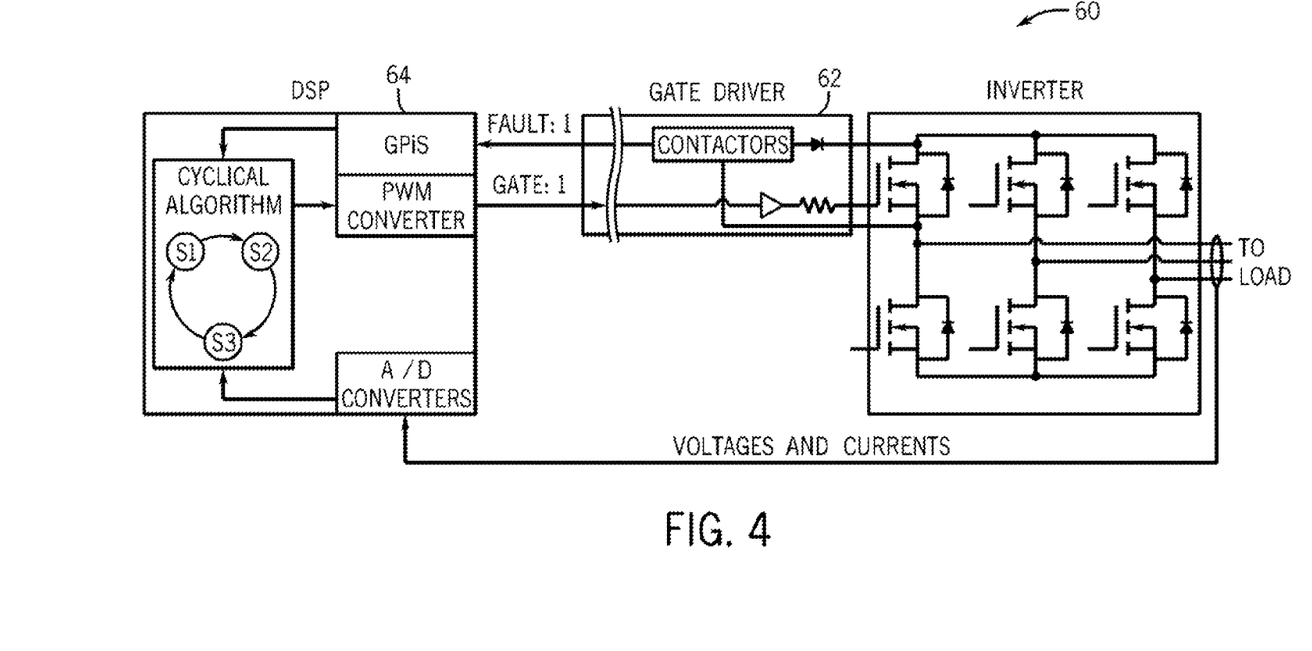
FIG. 4 is a schematic of a desaturation control circuit for use in the ASD of FIG. 1, according to an embodiment of the invention.

A diagram of a desaturation control circuit 60 is provided in FIG. 4, according to an embodiment of the invention, with the desaturation control circuit including a gate driver 62 that controls gating of switches in an inverter (e.g., inverter 24). The desaturation control circuit 60 also includes a digital signal processor (DSP) 64 having a control algorithm thereon that sends signals to, and receives signals from, the gate driver 62. The principle of operation of the desaturation control circuit 60 functioning as a protection mechanism is based on the fact that voltage across a power electronics switch (e.g., IGBT switch 20) is a function of current flowing through the switch. If the switch current exceeds its maximum allowed value, the voltage across the switch will pass a threshold voltage that corresponds to its maximum allowed current. Here the switching state should be taken into account—in the "Off" state (i.e., gate signal is 0), the voltage across the switch is equal to the DC link voltage even if a current through the switch is zero. According to embodiments of the invention, desaturation circuits 60 can be installed only on the upper and lower transistors on the shorted phase (e.g., transistors/IGBTs 44, 46 in FIGS. 2 and 3) or on the upper and lower transistors on all three phases.

Figure 5:
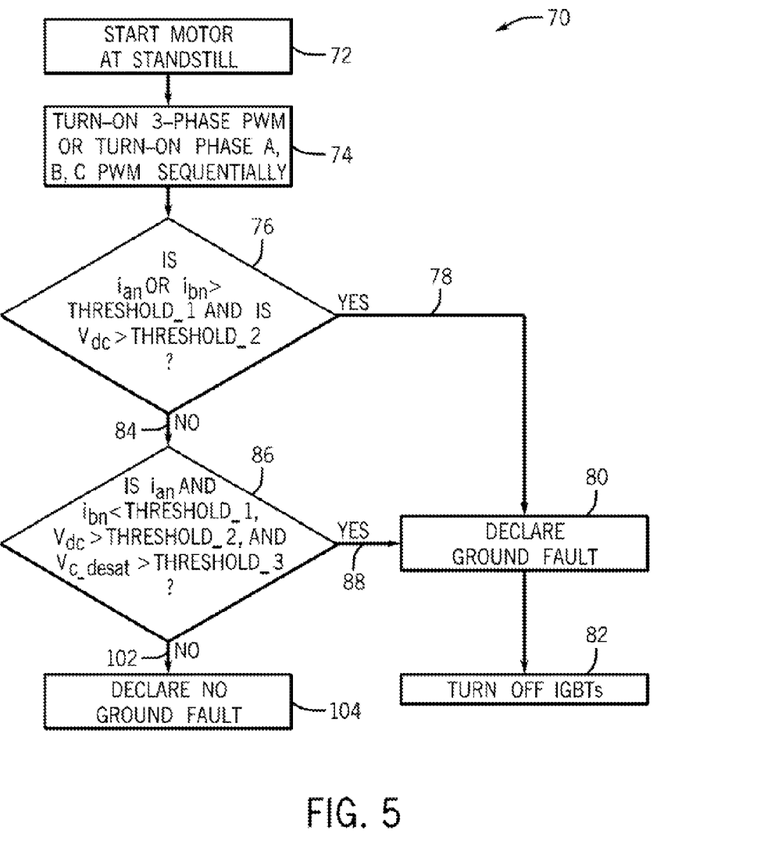
FIG. 5 is a flowchart illustrating a technique for detection of a ground fault in the ASD of FIG. 1 when the motor driven by the ASD is at motor standstill, according to an embodiment of the invention.

Referring now to FIG. 5, and with continued reference to FIGS. 2 and 3, an exemplary embodiment of a technique 70 for detection of a ground fault in an ASD by utilizing current sensors on only two phases is shown, in a scenario where a motor 26 associated with the ASD 10 is at motor standstill. The technique 70 may be implemented by way of a controller associated with the ASD, such as controller 28 connected to ASD 10. The combination of current sensors 56, 58 on phase-A and phase-B, along with the desaturation control circuit 60 (FIG. 4) enables implementation of technique 70 for the detection of a ground fault on all three phases of the output of the ASD 10, even though there is no current sensor on the phase-C output to the motor.

As shown in FIG. 5, technique 70 begins at STEP 72 with starting of the motor at standstill. Pulse width modulation (PWM) is then commenced at STEP 74 by controlling gating of switches in the inverter, with the PWM either being a three-phase simultaneous PWM or a sequential PWM, where the three phases are turned-on sequentially. Upon initiation of the PWM, technique continues at STEP 76, where a determination is made as to whether a current measured on either phase-A or phase-B, $i_{an}$ or $i_{bn}$, exceeds a pre-determined current threshold (Threshold_1), along with a determination of whether a voltage on the DC link 34 of ASD 10, $v_{dc}$, exceeds a pre-determined voltage threshold (Threshold_2). It is noted that the voltage $v_{dc}$ is influenced by switches 44, 46 corresponding to phase-C, where no output current sensor is used. If it is determined at STEP 76 that the phase current $i_{an}$ or $i_{bn}$ exceeds the pre-determined current threshold (Threshold_1) and that DC link voltage $v_{dc}$ exceeds the pre-determined voltage threshold (Threshold_2), indicated at 78, then technique continues at STEPS 80 and 82 where a ground fault is declared as being present in ASD 10 and IGBTs (i.e., IGBTs 44-54) in the ASD 10 are turned off, so as to protect the ASD from damage. Thus, if a ground fault is present in either phase-A or phase-B in ASD 10, the determination 78 made at STEP 76 will provide for detection of such a ground fault.

Conversely, if it is determined at STEP 76 that the current $i_{an}$ or $i_{bn}$ does not exceed the pre-determined current threshold and/or that voltage $v_{dc}$ does not exceed the pre-determined voltage threshold, indicated at 84, then technique continues at STEP 86, where another voltage and current analysis is performed in order to determine the presence of a ground fault. That is, at STEP 86, a determination is made as to whether the currents $i_{an}$ and $i_{bn}$ are below the pre-determined current threshold (Threshold_1). Further determinations are made at STEP 86 as to whether the voltage $v_{dc}$ exceeds the pre-determined voltage threshold (Threshold_2) and whether measured IGBT saturation voltages on phase-C (i.e., a voltage across switches 44, 46 in FIGS. 2 and 3), $v_{c\_desat}$, as determined via the desaturation control circuit (FIG. 4), are above a pre-determined threshold (Threshold_3). With respect to the measured IGBT saturation voltages, $V_{c\_desat}$, it is recognized that if the measured voltage across the IGBTs, such as 44, 46, exceeds the pre-determined voltage threshold (Threshold_3), than the current flowing through the IGBTs 44, 46 will also exceed a corresponding current threshold.

Figure 6:
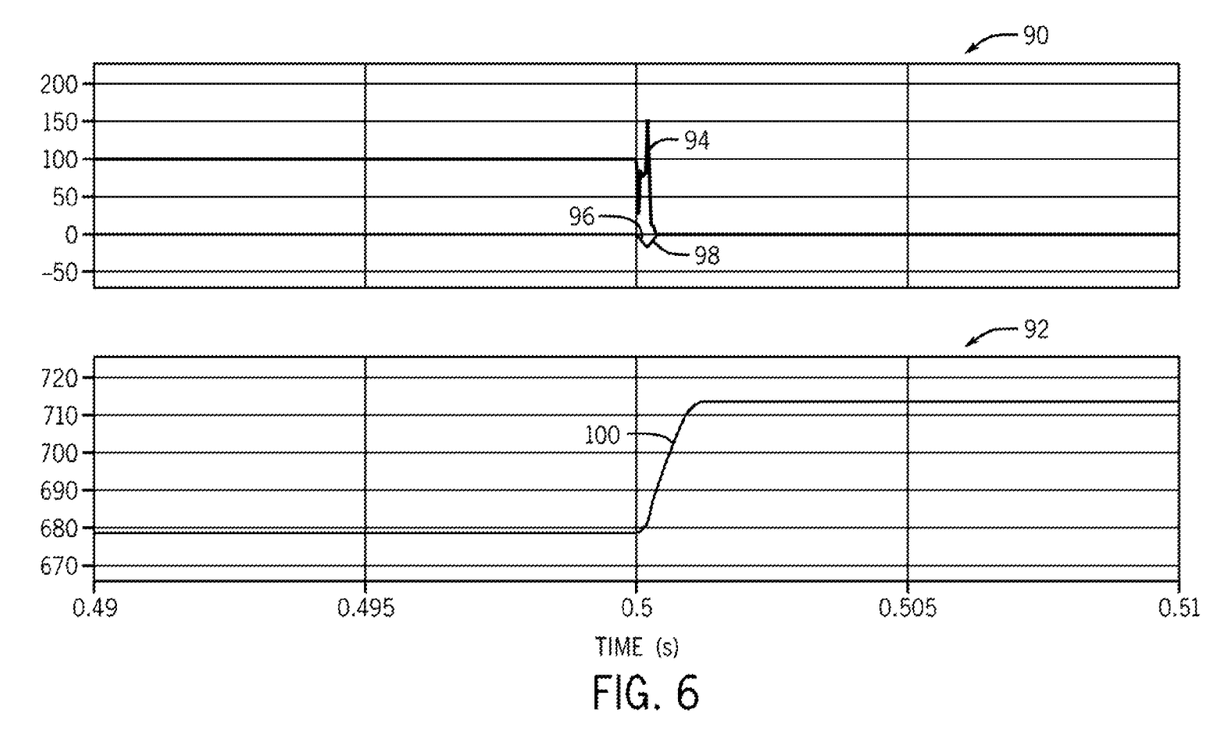
FIG. 6 is a graph illustrating current and voltage values corresponding to a ground fault on one phase in the ASD of FIG. 1 at motor standstill.

If it is determined at STEP 86 that the currents $i_{an}$ and $i_{bn}$ are below the pre-determined current threshold (Threshold_1), that the DC link voltage $v_{d\_c}$ exceeds the pre-determined voltage threshold (Threshold_2), and that the voltage $v_{c\_desat}$ is above the pre-determined threshold (Threshold_3), as indicated at 88, then technique continues at STEPS 80 and 82, where a ground fault is declared as being present in ASD 10 and the IGBTs in the ASD 10 are turned off, so as to protect the ASD from damage. Thus, if a ground fault is present in phase-C in ASD 10, the determination made at STEP 88 will provide for detection of such a ground fault. FIG. 6 illustrates a determination of such a ground fault on phase-C via the illustration of the motor currents and DC link voltage under a ground fault condition on phase-C at motor standstill. The upper window 90 in FIG. 6 is illustrative of the three-phase motor currents, while the lower window 92 is illustrative of the DC link voltage. As can be seen in FIG. 6, phase-C current 94 shoots up sharply, while phases A and B currents 96, 98 increase but likely do not reach their trip levels (i.e., Threshold_1) as quickly. In the meantime, the DC link voltage 100 increases. In implementing the technique 70 (FIG. 5), and the determination made at STEP 86, the logic in controller 28 is configured in such a way that the system will trip, triggered by phase-C over-voltage detection ($v_{c\_desat}$), with a timer then continuing to run so as to capture if there is also a DC link over-voltage (i.e., $v_{dc}$>Threshold_2). When both signals, $v_{c\_desat}$ and $v_{dc}$, reach the respective thresholds, the ground fault condition is confirmed.

Referring again to FIG. 5, if it is determined at STEP 86 that either the voltage $v_{dc}$ does not exceed the pre-determined voltage threshold (Threshold_2) or that the measured IGBT saturation voltage $v_{c\_desat}$ is not above the pre-determined voltage threshold (Threshold_3), as indicated at 102, then technique continues at STEP 104, where it is declared that no ground fault is present in ASD 10. The technique 70 then would end, with the motor transitioning from standstill to a running condition, which will be discussed in detail below with respect to FIG. 7.

The technique 70 thus provides for detection of a ground fault in an ASD at motor standstill by utilizing current sensors on only two phases. The feedback from the two current sensors is analyzed in conjunction with voltage (and corresponding current) feedback from a desaturation control circuit, and in conjunction with DC link voltage information, to provide for the detection of a ground fault on all three phases of the output of the ASD, even though there is no current sensor on one phase of the output to the motor.

Figure 7:
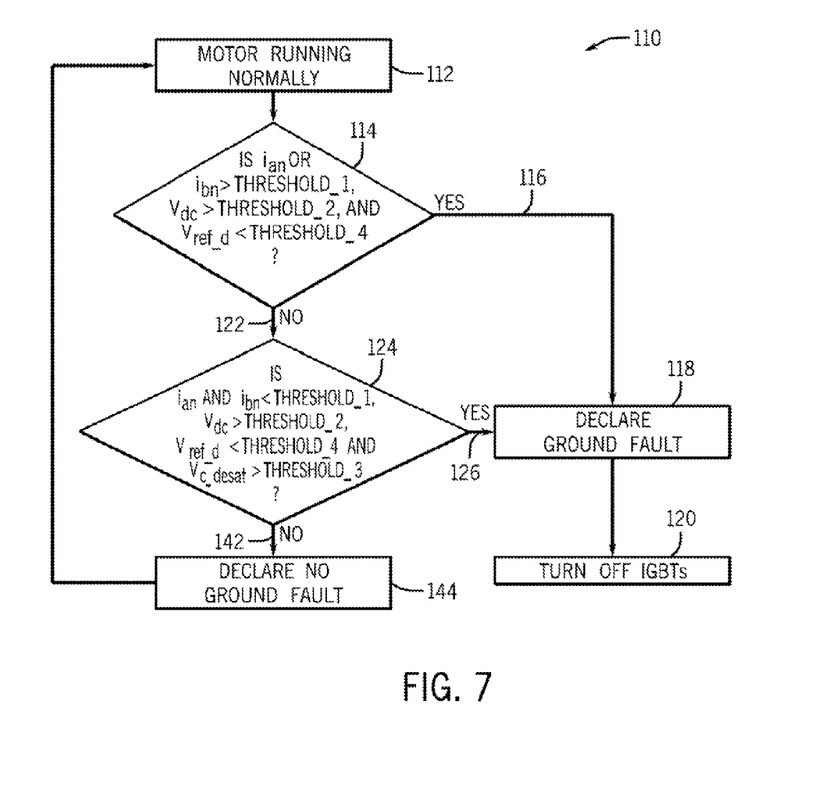
FIG. 7 is a flowchart illustrating a technique for detection of a ground fault in the ASD of FIG. 1, when the motor driven by the ASD is running, according to an embodiment of the invention.

Referring now to FIG. 7, and with continued reference to FIGS. 2 and 3, an exemplary embodiment of a technique 110 for detection of a ground fault in an ASD by utilizing current sensors on only two phases is shown, in a scenario where a motor associated with the ASD is running In implementing technique 110, it is envisioned that the motor will be driving a load under normal operating conditions, when a ground fault suddenly occurs in one phase, such as phase-C for example, as described with respect to the technique 110. Similar to the technique 70 (FIG. 5) for detecting ground faults at motor standstill, the technique 110 for detecting ground faults during motor operation may be implemented by way of a controller associated with the ASD, such as controller 28 connected to ASD 10. The combination of current sensors 56, 58 on phase-A and phase-B along with the desaturation control circuit 60 (FIG. 4) and the DC link voltage profile enables implementation of technique 110 for the detection of a ground fault on all three phases of the output of the ASD 10, even though there is no current sensor on the phase-C output to the motor.

Figure 8:
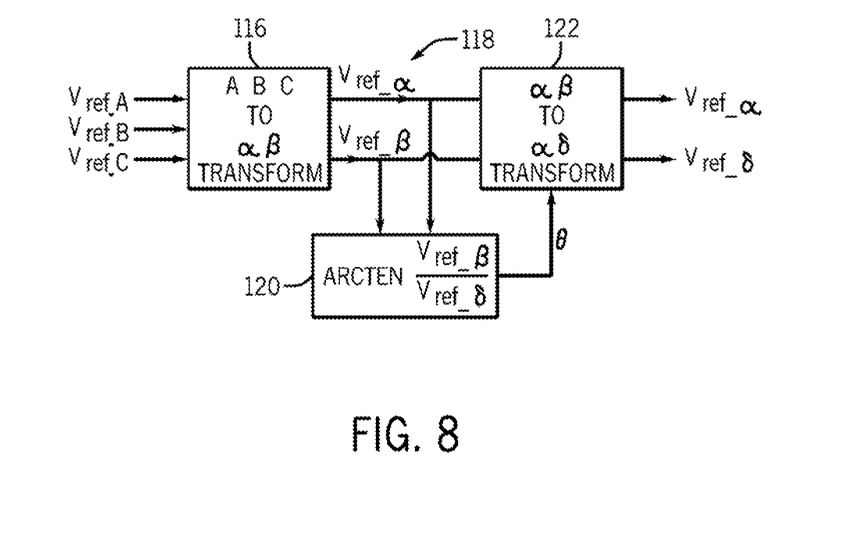
FIG. 8 is a chart illustrating a technique for processing three phase output voltages of the ASD into a two phase output.

As shown in FIG. 7, technique 110 begins at STEP 112 with the motor running in a "normal" condition (i.e., no ground current faults present). The technique then continues at STEP 114, where determinations are made as to whether a current measured on either phase-A or phase-B, $i_{an}$ or $i_{bn}$, exceeds a pre-determined current threshold (Threshold_1) and as to whether a voltage on the DC link of ASD, $v_{dc}$, exceeds a pre-determined voltage threshold (Threshold_2). Also at STEP 114, a determination is made as to whether a motor output reference voltage, $v_{ref\_d}$, of the d-q voltage component for the inverter PWM commands, drops to reach (i.e., is below) a pre-determined voltage threshold (Threshold_4). The motor output reference voltage, $v_{ref\_d}$, is determined based on a processing of the PWM reference voltages, $v_{ref\_a}$, $v_{ref\_b}$, $v_{ref\_c}$, as shown in FIG. 8, with the PWM reference voltage quantities first being transformed to two phase alternating quantities, and then to two phase d-q DC quantities. As shown in FIG. 8, an alpha-beta transform (αβ transform) 116 is applied to generate reference voltages, $v_{ref\ \alpha}$, $v_{ref\ \beta}$, in the αβ reference frame. The αβ reference voltages 118, as well as an arctan of the αβ reference voltages 120, are then plugged into a d-q transform 122 to generate reference voltages, $v_{ref\_d}$, $v_{ref\_q}$, in the d-q reference frame. The motor output reference voltage, $v_{ref\_d}$, is thus acquired from the processing of the PWM reference voltages, $v_{ref\_a}$, $v_{ref\_b}$, $v_{ref\_c}$, as shown in FIG. 8. With respect to the PWM reference voltages, $v_{ref\_a}$, $v_{ref\_b}$, $v_{ref\_c}$, it is recognized that the motor three phase output reference voltages are dynamically adjusted based on the variation of the DC link voltage, $v_{dc}$. Thus, for example, when the voltage $v_{dc}$ increases, the PWM duty cycles, and the corresponding motor output reference voltage, $v_{ref\_d}$, are reduced, and vice versa. Final adjusted voltages $v_d$, $v_q$ are thus output into the inverter based on the reference voltages $v_{ref\ d}$, $v_{ref\ q}$ and the DC link voltage $v_{dc}$.

Referring again now to FIG. 7, if it is determined at STEP 114 that the current $i_{an}$ or $i_{bn}$ exceeds the pre-determined current threshold (Threshold_1), and that voltage $v_{dc}$ exceeds the pre-determined voltage threshold (Threshold_2), and that the motor output reference voltage, $v_{ref\_d}$, drops below (i.e., is less than) the pre-determined voltage threshold (Threshold_4), indicated at 116, then technique continues at STEPS 118 and 120 where a ground fault is declared as being present in ASD 10 and IGBTs in the ASD are turned off, so as to protect the ASD from damage. Thus, if a ground fault is present in either phase-A or phase-B in ASD 10, the determination 116 made at STEP 114 will provide for detection of such a ground fault.

Conversely, if it is determined at STEP 114 that the current $i_{an}$ or $i_{bn}$ does not exceed the pre-determined current threshold and/or that DC link voltage $v_{dc}$ does not exceed the pre-determined voltage threshold, and/or that the motor output reference voltage, $v_{ref\_d}$, does not drop below (i.e., is greater than) the pre-determined voltage threshold (Threshold_4), indicated at 122, then technique continues at STEP 124, where another voltage and current analysis is performed in order to determine the presence of a ground fault. That is, at STEP 124, determinations are made as to whether the currents $i_{an}$ and $i_{bn}$ are below the pre-determined current threshold (Threshold_1) and as to whether the voltage $v_{dc}$ exceeds the pre-determined voltage threshold (Threshold_2). Determinations are also made at STEP 124 as to whether the motor output reference voltage, $v_{ref\_d}$, is less than the pre-determined voltage threshold (Threshold_4) and as to whether the measured IGBT saturation voltage(s) on phase-C (i.e., voltage across switches 44, 46 in FIGS. 2 and 3), $v_{c\_desat}$, as determined via the desaturation control circuit (FIG. 4), is above a pre-determined voltage threshold (Threshold_3). With respect to the measured IGBT saturation voltages, $v_{c\_desat}$, it is recognized that if the measured voltage across the IGBTs 44, 46 exceeds the pre-determined voltage threshold (Threshold_3), than the current flowing through the IGBTs 44, 46 will also exceed a corresponding current threshold.

Figure 9:
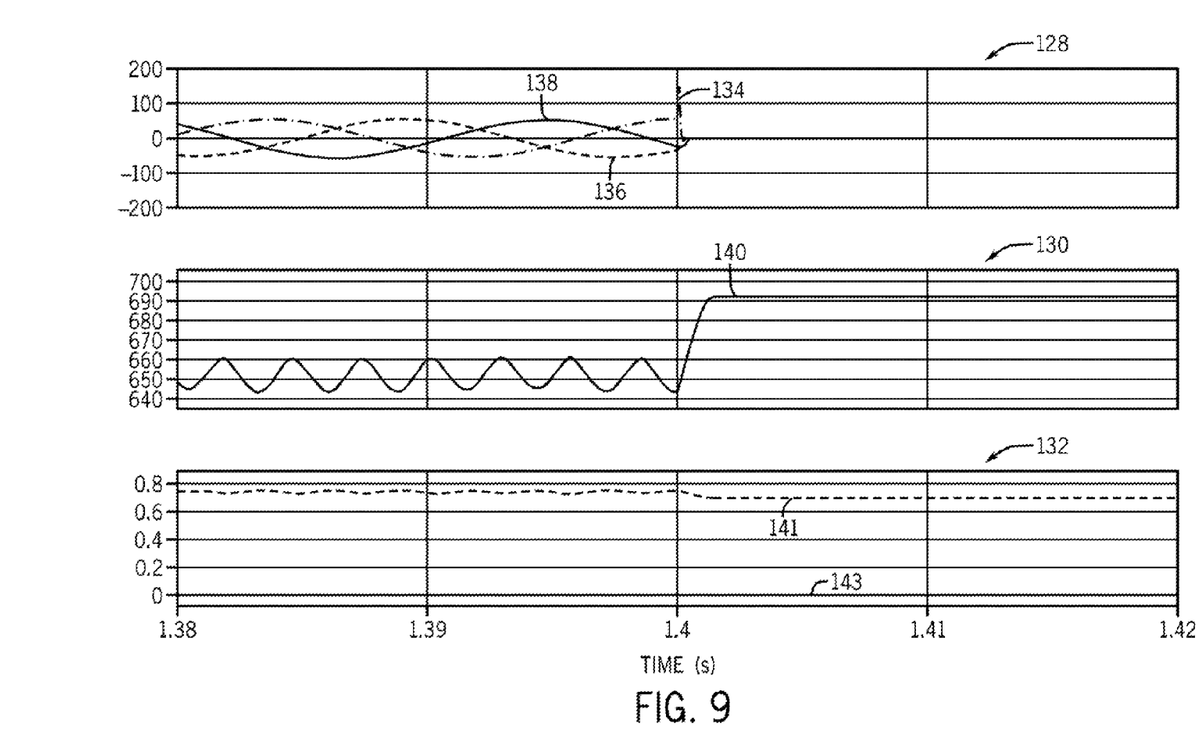
FIG. 9 is a graph illustrating current and voltage values corresponding to a ground fault on one phase in the ASD of FIG. 1 while the motor is running.

If it is determined at STEP 124 that the currents $i_{an}$ and $i_{bn}$ are below the pre-determined current threshold (Threshold_1), and that the DC link voltage $v_{dc}$ exceeds the pre-determined voltage threshold (Threshold_2), and that the motor output reference voltage, $v_{ref\_d}$, drops below (is less than/below) the pre-determined voltage threshold (Threshold_4), and that the measured IGBT saturation voltage(s) $v_{c\_desat}$ is above the pre-determined threshold (Threshold_3), as indicated at 126, then technique continues at STEPS 118 and 120 where a ground fault is declared as being present in ASD 10 and IGBTs in the ASD are turned off, so as to protect the ASD from damage. Thus, if a ground fault is present in phase-C in ASD 10, the determination made at STEP 126 will provide for detection of such a ground fault. FIG. 9 illustrates a determination of such a ground fault on phase-C via the illustration of the motor currents, DC link voltage, and motor output reference voltage, with the motor driving a load when a ground fault suddenly occurs in phase-C. The upper window 128 in FIG. 9 is illustrative of the three-phase motor currents, with the middle window 130 being illustrative of the DC link voltage and the lower window 132 being illustrative of the two-phase d and q components of the final adjusted voltages $v_d$, $v_q$ that are output into the inverter. As can be seen in FIG. 9, phase-C current 134 shoots up sharply, while phases A and B currents 136, 138 increase but likely do not reach their trip levels (i.e., Threshold_1) as quickly. In the meantime, the DC link voltage 140 increases. As indicated in FIG. 9, there can be a delay between phase-C over-current detection $i_{c\_desat}$ reaching its overcurrent trip threshold (Threshold_3) and the DC link voltage $v_{dc}$ reaching its over-voltage trip threshold (Threshold_2), with the DC link voltage also affecting the final adjusted voltages $v_d$, $v_q$ that are output into the inverter. When both signals reach the respective thresholds, the ground fault condition is confirmed and declared at STEP 120.

Referring again to FIG. 7, if it is determined at STEP 124 that either the voltage $v_{dc}$ does not exceed the pre-determined voltage threshold (Threshold_2) or that the measured IGBT saturation voltage(s) $v_{c\_desat}$ is not above the pre-determined threshold (Threshold_3), as indicated at 142, then technique continues at STEP 144, where it is declared that no ground fault is present in ASD 10. The technique 110 can then continue by looping back to STEP 112, where the motor continues to run and subsequent analysis of the currents and voltage in the ASD are performed.

The technique 110 thus provides for detection of a ground fault in an ASD during normal operation/running of the motor by utilizing current sensors on only two phases. The feedback from the two current sensors is analyzed in conjunction with voltage (and corresponding current) feedback from a desaturation control circuit, as well as the DC link voltage characteristics, to provide for the detection of a ground fault on all three phases of the output of the ASD, even though there is no current sensor on one phase of the output to the motor.

It is recognized that, depending on the ASD system operating conditions—such as load variations, switching frequency settings, the time moment when the ground fault occurs with a particular current amplitude, system impedance variations, etc.—there can be various severities of each ground fault as well as the fault sequence variation. For example, in one ground fault scenario, the motor phase current may exceed the fault threshold first-in-time, then the DC link voltage may exceed the fault threshold second-in-time. In another ground fault scenario, the DC link voltage may exceed the fault threshold first-in-time, then the motor phase current may exceed the fault threshold second-in-time. Regardless of these scenario variations, the methods provided according to embodiments of the invention can provide ground fault detection, identification, and protection for the ASD system.

Beneficially, embodiments of the invention thus provide a system and method of ground fault detection and protection in adjustable speed drives that utilize only two output current sensors, without a need for a current shunt on the DC link. The detection methods implement a combination of already available motor current measurements, DC link voltage measurements, IGBT desaturation circuits, and control logics. The technique is effective to isolate faults if the fault is due to an over-current fault independent of a ground fault, or a DC link voltage fault independent of a ground fault, or it is truly a ground fault, and can be implemented regardless of whether the motor is sitting at standstill or in a running condition. Embodiments of the invention not only identify a ground fault condition in an ASD system, but also determine exactly which phase out of three motor outputs that a ground fault occurs on. The IGBTs in the ASD can then be turned off when a ground fault is identified to protect the equipment from any damage. Embodiments of the invention thus uniquely provide precise ground fault diagnostic and protective features.

A technical contribution for the disclosed method and apparatus is that it provides for a computer implemented technique for detecting ground faults in an ASD and protecting the ASD from such ground faults upon detection thereof. The technique implements a combination of already available motor current measurements, DC link voltage measurements, IGBT desaturation circuits, and control logics to detect ground faults in an ASD, with only two output current sensors on two phases of the output being needed.

According to one embodiment of the present invention, an AC motor drive having an input connectable to an AC source and a three phase output connectable to an input terminal of an AC motor is provided, with the AC motor drive including a pulse width modulation (PWM) inverter having a plurality of switches therein to control current flow and terminal voltages in the AC motor. The AC motor drive also includes a fault detection and protection system connected to the PWM converter, with the fault detection and protection system further including a pair of current sensors to measure a current on a first phase and a second phase of the AC motor drive output, a voltage sensor to measure a DC link voltage on a DC link of the AC motor drive, a desaturation control circuit configured to determine a voltage and associated current across switches of the PWM inverter corresponding to a third phase of the three phase output, and a controller configured to compare the current measured on the first phase and the second phase of the three phase output to a first threshold, compare the measured DC link voltage to a second threshold, compare the voltage across the switches of the PWM inverter on the third phase to a third threshold, and detect a ground fault on one of the first, second, and third phases of the three phase output to the AC motor based on the comparisons of the first and the second phase currents, DC link voltage, and voltage across the switches on the third phase, to the first, second, and third thresholds.

According to another embodiment of present invention, a method for detecting a ground fault in an AC motor drive includes providing an AC motor drive in series between an AC power source and the AC motor, the AC motor drive comprising a pulse width modulation (PWM) inverter having a plurality of switches and being configured to condition a three phase output to the AC motor. The method also includes measuring current at least on each of a first phase and a second phase of the three phase output by way of current sensors included on the first phase and the second phase, measuring a voltage on a DC link of the AC motor drive, and measuring a voltage across switches of the PWM inverter corresponding to a third phase of the three phase output by way of a desaturation control circuit, with a current across the switches of the PWM inverter corresponding to the third phase also being determined based on the measured voltage. The method further includes comparing the current measured on the first phase and the second phase of the three phase output to a first threshold, comparing the measured DC link voltage to a second threshold, comparing the voltage across the switches of the PWM inverter on the third phase to a third threshold, and determining the presence of a ground fault on one of the first, second, and third phases of the three phase output to the AC motor based on the comparisons of the first and the second phase currents, DC link voltage, and voltage across the switches on the third phase, to the first, second, and third thresholds.

According to yet another embodiment of the present invention, a system for detecting a ground fault in an AC motor drive includes a pair of current sensors to measure a current on a first phase and a second phase of a three phase output of the AC motor drive, a voltage sensor to measure a DC link voltage on a DC link in the AC motor drive, and a desaturation control circuit configured to determine a voltage and associated current across IGBTs of an inverter in the AC motor drive, the desaturation control circuit determining the voltage and associated current at least on a third phase of the three phase output. The system also includes a controller configured to compare the current measured on the first phase and the second phase of the three phase output to a first threshold, compare the measured DC link voltage to a second threshold, compare the voltage across the IGBTs of the inverter corresponding to the third phase to a third threshold, and declare a ground fault on one of the first, second, and third phases of the three phase output if one of the first and the second phase currents is above the first threshold and the DC link voltage is above the second threshold or if the first and the second phase currents are below the first threshold, the DC link voltage is above the second threshold, and the voltage across IGBTs of the inverter corresponding to the third phase is above the third threshold.

The present invention has been described in terms of the preferred embodiment, and it is recognized that equivalents, alternatives, and modifications, aside from those expressly stated, are possible and within the scope of the appending claims.

What is claimed is:

1. An AC motor drive having an input connectable to an AC source and a three phase output connectable to an input terminal of an AC motor, the AC motor drive comprising:
    a pulse width modulation (PWM) inverter having a plurality of switches therein to control current flow and terminal voltages in the AC motor; and
    a fault detection and protection system connected to the PWM inverter, the fault detection and protection system comprising:
        a pair of current sensors to measure a current on a first phase and a second phase of the AC motor drive output;
        a voltage sensor to measure a DC link voltage on a DC link of the AC motor drive;
        a desaturation control circuit configured to determine a voltage and associated current across switches of the PWM inverter corresponding to a third phase of the three phase output; and
        a controller configured to:
            compare the current measured on the first phase and the second phase of the three phase output to a first threshold;
            compare the measured DC link voltage to a second threshold;
            compare the voltage across the switches of the PWM inverter on the third phase to a third threshold; and
            detect a ground fault on one of the first, second, and third phases of the three phase output to the AC motor based on the comparisons of the first and the second phase currents, DC link voltage, and voltage across the switches on the third phase, to the first, second, and third thresholds.

2. The AC motor drive of claim 1 wherein the controller is further configured to detect the ground fault while the AC motor is at a standstill.

3. The AC motor drive of claim 2 wherein the controller is further configured to declare a ground fault when one of the first and the second phase currents is above the first threshold and the DC link voltage is above the second threshold.

4. The AC motor drive of claim 2 wherein the controller is configured to declare a ground fault when the first and the second phase currents are below the first threshold, the DC link voltage is above the second threshold, and the voltage across switches of the PWM inverter corresponding to the third phase of the three phase output is above the third threshold.

5. The AC motor drive of claim 1 wherein the controller is configured to detect the ground fault while the AC motor is running.

6. The AC motor drive of claim 5 wherein the controller is further configured to further comprising:
    determine a d-q voltage component of a motor output reference voltage; and
    compare the d-q voltage component of the motor output reference voltage to a fourth threshold.

7. The AC motor drive of claim 6 wherein the controller is configured to declare a ground fault when one of the first and the second phase currents is above the first threshold, the DC link voltage is above the second threshold, and the d-q voltage component of the motor output reference voltage is below the fourth threshold.

8. The AC motor drive of claim 6 wherein the controller is configured to declare a ground fault when the first and the second phase currents are below the first threshold, the DC link voltage is above the second threshold, the d-q voltage component of the motor output reference voltage is below the fourth threshold, and the voltage across switches of the PWM inverter corresponding to the third phase of the three phase output is above the third threshold.

9. The AC motor drive of claim 1 wherein the third threshold comprises a voltage threshold, and wherein when the voltage across the switches on the third phase exceeds the voltage threshold, the associated current across the switches on the third phase exceeds a corresponding current threshold.

10. The AC motor drive of claim 1 wherein the plurality of switches in the PWM inverter comprises IGBTs, and wherein the controller is further configured to gate off the plurality of IGBTs when a ground fault is detected, so as to protect the AC motor drive from damage resulting from the ground fault.

11. The AC motor drive of claim 1 wherein the controller is further configured to detect which of the first, second, and third phases the ground fault occurs on.

12. A method for detecting a ground fault in an AC motor drive comprising:
    providing an AC motor drive in series between an AC power source and the AC motor, the AC motor drive comprising a pulse width modulation (PWM) inverter having a plurality of switches and being configured to condition a three phase output to the AC motor;
    measuring current at least on each of a first phase and a second phase of the three phase output by way of current sensors included on the first phase and the second phase;
    measuring a voltage on a DC link of the AC motor drive;
    measuring a voltage across switches of the PWM inverter corresponding to a third phase of the three phase output by way of a desaturation control circuit, with a current across the switches of the PWM inverter corresponding to the third phase also being determined based on the measured voltage;
    comparing the current measured on the first phase and the second phase of the three phase output to a first threshold;
    comparing the measured DC link voltage to a second threshold;

comparing the voltage across the switches of the PWM inverter on the third phase to a third threshold; and determining the presence of a ground fault on one of the first, second, and third phases of the three phase output to the AC motor based on the comparisons of the first and the second phase currents, DC link voltage, and voltage across the switches on the third phase, to the first, second, and third thresholds.

13. The method of claim 12 wherein the ground fault is detected in the AC motor drive while the AC motor is at a standstill.

14. The method of claim 13 further comprising declaring a ground fault when one of the first and the second phase currents is above the first threshold and the DC link voltage is above the second threshold.

15. The method of claim 13 further comprising declaring a ground fault when the first and the second phase currents are below the first threshold, the DC link voltage is above the second threshold, and the voltage across switches of the PWM inverter corresponding to the third phase of the three phase output is above the third threshold.

16. The method of claim 12 wherein the ground fault is detected in the AC motor drive while the AC motor is running.

17. The method of claim 16 further comprising:
determining a d-q voltage component of a motor output reference voltage; and
comparing the d-q voltage component of the motor output reference voltage to a fourth threshold.

18. The method of claim 17 further comprising declaring a ground fault when one of the first and the second phase currents is above the first threshold, the DC link voltage is above the second threshold, and the d-q voltage component of the motor output reference voltage is below the fourth threshold.

19. The method of claim 17 further comprising declaring a ground fault when the first and the second phase currents are below the first threshold, the DC link voltage is above the second threshold, the d-q voltage component of the motor output reference voltage is below the fourth threshold, and the voltage across switches of the PWM inverter on the third phase of the three phase output is above the third threshold.

20. The method of claim 12 wherein the plurality of switches comprises a plurality of insulated gate bipolar transistors (IGBTs);
and wherein, when it is determined that a ground fault is present, the method further comprises turning-off the plurality of IGBTs so as to protect the AC motor drive from damage resulting from the ground fault.

21. The method of claim 12 wherein the third threshold comprises a voltage threshold, and wherein when the voltage across the switches on the third phase exceeds the voltage threshold, the associated current across the switches on the third phase exceeds a corresponding current threshold.

22. A system for detecting a ground fault in an AC motor drive, the system comprising:
a pair of current sensors to measure a current on a first phase and a second phase of a three phase output of the AC motor drive;
a voltage sensor to measure a DC link voltage on a DC link in the AC motor drive;
a desaturation control circuit configured to determine a voltage and associated current across insulated gate bipolar transistors (IGBTs) of an inverter in the AC motor drive, the desaturation control circuit determining the voltage and associated current at least on a third phase of the three phase output; and
a controller configured to:
compare the current measured on the first phase and the second phase of the three phase output to a first threshold;
compare the measured DC link voltage to a second threshold;
compare the voltage across the IGBTs of the inverter corresponding to the third phase to a third threshold; and
declare a ground fault on one of the first, second, and third phases of the three phase output if:
one of the first and the second phase currents is above the first threshold and the DC link voltage is above the second threshold; or
the first and the second phase currents are below the first threshold, the DC link voltage is above the second threshold, and the voltage across IGBTs of the inverter corresponding to the third phase is above the third threshold.

23. The system of claim 22 wherein the controller is further configured to:
determine a d-q voltage component of a motor output reference voltage;
compare the d-q voltage component of the motor output reference voltage to a fourth threshold; and
declare a ground fault on one of the first, second, and third phases of the three phase output if:
one of the first and the second phase currents is above the first threshold, the DC link voltage is above the second threshold, and the d-q voltage component of the motor output reference voltage is below the fourth threshold; or
the first and the second phase currents are below the first threshold, the DC link voltage is above the second threshold, the d-q voltage component of the motor output reference voltage is below the fourth threshold, and the current across the IGBTs of the inverter corresponding to the third phase is above the third threshold.

24. The AC motor drive of claim 1 wherein a first current sensor of the pair of current sensors only measures the current on the first phase and a second current sensor of the pair of current sensors only measures the current on the second phase.

* * * * *